(12) United States Patent
Miyamoto et al.

(10) Patent No.: US 8,155,969 B2
(45) Date of Patent: Apr. 10, 2012

(54) SUBTITLE GENERATION AND RETRIEVAL COMBINING DOCUMENT PROCESSING WITH VOICE PROCESSING

(75) Inventors: Kohtaroh Miyamoto, Yorktown Heights, NY (US); Noriko Nagishi, Yorktown Heights, NY (US); Kenichi Arakawa, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 31 days.

(21) Appl. No.: 12/538,944

(22) Filed: Aug. 11, 2009

(65) Prior Publication Data
US 2010/0036664 A1   Feb. 11, 2010

Related U.S. Application Data

(62) Division of application No. 11/338,100, filed on Jan. 23, 2006.

(30) Foreign Application Priority Data

Dec. 21, 2004   (JP) .................................. 2004-369784

(51) Int. Cl.
*G10L 11/00*   (2006.01)

(52) U.S. Cl. ......... 704/270; 704/275; 707/711; 707/725
(58) Field of Classification Search ............... 704/3, 270, 704/246, 275; 707/3, 736, 748, 711, 725; 715/203, 204
See application file for complete search history.

(56) References Cited

U.S. PATENT DOCUMENTS

| | | | | |
|---|---|---|---|---|
| 5,835,087 A * | 11/1998 | Herz et al. | ..... | 715/810 |
| 6,081,262 A * | 6/2000 | Gill et al. | ..... | 715/202 |
| 6,243,713 B1 * | 6/2001 | Nelson et al. | ..... | 1/1 |
| 6,507,838 B1 * | 1/2003 | Syeda-Mahmood | ..... | 1/1 |
| 6,580,437 B1 * | 6/2003 | Liou et al. | ..... | 715/719 |
| 6,718,308 B1 * | 4/2004 | Nolting | ..... | 704/275 |
| 7,149,972 B2 * | 12/2006 | Baumeister et al. | ..... | 715/716 |
| 7,292,979 B2 * | 11/2007 | Karas et al. | ..... | 704/244 |
| 7,298,930 B1 * | 11/2007 | Erol et al. | ..... | 382/305 |
| 7,490,092 B2 * | 2/2009 | Sibley et al. | ..... | 707/100 |

(Continued)

FOREIGN PATENT DOCUMENTS

JP   HEI07-182365   7/1995

(Continued)

OTHER PUBLICATIONS

A. Ando, T. Imai, A Kobayashi, H. Isono and K. Nakabayashi, "Real-time transcription system for simultaneous subtitling of Japanese broadcast news programs," IEEE Trans. Broadcasting, vol. 46, No. 3, pp. 189-196, Sep. 2000.*

(Continued)

*Primary Examiner* — Vijay B Chawan
*Assistant Examiner* — Greg Borsetti
(74) *Attorney, Agent, or Firm* — Michael J. Buchenhorner; Vazken Alexanian

(57) ABSTRACT

An apparatus for retrieving a character string includes: storage for storing text data obtained by recognizing a voice in a presentation, second text data extracted from document data used in the presentation, and associated information of the first text data and the second text data. The apparatus also includes a retrieval unit for retrieving, by use of the associated information, the character string from text data composed from the first text data and the second text data.

14 Claims, 13 Drawing Sheets

U.S. PATENT DOCUMENTS

| | | | |
|---|---|---|---|
| 7,555,431 B2* | 6/2009 | Bennett | 704/255 |
| 7,706,615 B2* | 4/2010 | Hirota et al. | 382/186 |
| 7,729,917 B2* | 6/2010 | Miyamoto et al. | 704/270 |
| 2002/0164151 A1* | 11/2002 | Jasinschi et al. | 386/69 |
| 2003/0046276 A1* | 3/2003 | Gutierrez et al. | 707/3 |
| 2004/0117189 A1* | 6/2004 | Bennett | 704/270.1 |
| 2004/0267774 A1* | 12/2004 | Lin et al. | 707/100 |
| 2007/0038612 A1* | 2/2007 | Sull et al. | 707/3 |

FOREIGN PATENT DOCUMENTS

| | | |
|---|---|---|
| JP | 2002-268667 | 9/2002 |

OTHER PUBLICATIONS

Ziewer, P., Navigational Indices and Full-Text Search by Automated Analyses of Screen Recorded Data. E-Learn 2004, Washington, D.C., pp. 3055-3062, 2004.*

Hauptmann, A. G. and Wactlar, H. D., "Indexing and Search of Multimodal Information", Proceedings of ICASSP-97, pp. 195-198, Munich, 1997.*

Alexander G. Hauptmann and Andreas M. Olligschlaeger. 1999. Using location information from speech recognition of television news broadcasts. In Tony Robinson and Steve Renals, editors, Proceedings of the ESCA ETRW Workshop on Accessing Information in Spoken Audio, pp. 102-106. University of Cambridge, Cambridge, England. [online; cited Oct. 2004].*

Howard D. Wactlar, Alexander G. Hauptmann, Michael G. Christel, Ricky A. Houghton, Andreas M. Olligschlaeger, Complementary video and audio analysis for broadcast news archives, Communications of the ACM, v.43 n.2, p. 42-47, Feb. 2000.*

He et al. "Auto-Summarization of Audio-Video Presentations" 1999.*

* cited by examiner

| LINE | START | RESULT OF VOICE RECOGNITION |
|---|---|---|
| 1 | 0.949 | Until now |
| 2 | 1.388 | IBM's |
| 3 | 1.508 | efforts |
| 4 | 2.007 | have |
| 5 | 2.715 | been |
| 6 | 3.393 | merely a |
| 7 | 3.922 | process |
| 8 | 3.982 | for the |
| 9 | 4.501 | realization |
| 10 | 4.790 | of |
| 11 | 4.930 | ON |
| 12 | 5.548 | DEMAND |
| 13 | 5.648 | BUSINESS |

10a

| COMMON KEYWORD LIST | PRESENTATION TEXT | MASTER SUBTITLE |
|---|---|---|
| 1. IBM<br>2. STRATEGY<br>3. ON DEMAND<br>4. BUSINESS<br>5. PROCESS FLOW<br>6. e-BUSINESS<br>7. ACCESSIBILITY<br>8. SUBTITLE | The process flow of ON DEMAND BUSINESS<br><br>The IBM strategy so far<br><br>e-BUSINESS<br><br>ON DEMAND BUSINESS<br><br>Meaning of ACCESSIBILITY | Until now IBM's efforts have been merely a process for the realization of ON DEMAND BUSINESS. Currently, we are dealing with upcoming issues based on our past business |
| 10b | 10c | 10d |

FIG. 4

| PAGE | PRESENTATION TEXT | ATTRIBUTE |
|---|---|---|
| 1 | ON DEMAND BUSINESS NO KATEI | CHARACTER SIZE 24 |
| | IBM NO KOREMADENO STRATEGY | CHARACTER SIZE 20 |
| | e-BUSINESS | CHARACTER SIZE 16 |
| | ON DEMAND BUSINESS | CHARACTER SIZE 16 |
| | ACCESSIBILITY NO IGI | CHARACTER SIZE 10, BOLD FACED |
| ⋮ | ⋮ | ⋮ |

FIG. 5A

| PAGE | WORD | ATTRIBUTE |
|---|---|---|
| 1 | ON DEMAND | CHARACTER SIZE 24 |
| | BUSINESS | CHARACTER SIZE 24 |
| | KATEI | CHARACTER SIZE 24 |
| | IBM | CHARACTER SIZE 20 |
| | STRATEGY | CHARACTER SIZE 20 |
| | e-BUSINESS | CHARACTER SIZE 16 |
| | ON DEMAND | CHARACTER SIZE 16 |
| | BUSINESS | CHARACTER SIZE 16 |
| | ACCESSIBILITY | CHARACTER SIZE 10, BOLD FACED |
| ⋮ | ⋮ | ⋮ |

FIG. 5B

| ATTRIBUTE | WEIGHT |
|---|---|
| TITLE | 5 |
| CHARACTER SIZE 18 OR MORE | 4 |
| CHARACTER SIZE BETWEEN 10 AND 18 | 3 |
| CHARACTER SIZE 9 OR LESS | 2 |
| UNDERLINED CHARACTER | 2 |
| BOLDFACED CHARACTER | 3 |
| ALTERNATIVE TEXT | 1 |
| ⋮ | ⋮ |

FIG. 6

| RANK | KEYWORD | WEIGHT |
|---|---|---|
| 1 | IBM | 85 |
| 2 | STRATEGY | 79 |
| 3 | ON DEMAND | 77 |
| 4 | BUSINESS | 73 |
| 5 | KATEI | 65 |
| 6 | e-BUSINESS | 64 |
| 7 | ACCESSIBILITY | 60 |
| 8 | SUBTITLE | 55 |
| ⋮ | ⋮ | ⋮ |

| TIME | SUBTITLE |
|---|---|
| 0.949 | KOREMADENO |
| 1.388 | IBM NO |
| 1.508 | TORIKUMI |
| 2.007 | WA |
| 2.715 | ON DEMAND |
| 3.393 | BUSINESS |
| 3.922 | WO |
| 3.982 | JITSUGEN |
| 4.501 | SURU |
| 4.790 | UE |
| 4.930 | DENO KATEI |
| 5.548 | NI |
| 5.648 | SUGIMASEN. |
| ⋮ | ⋮ |

(b)

| PAGE | TIME |
|---|---|
| 1 | 0.000 |
| 2 | 150.599 |
| ⋮ | ⋮ |

FIG. 9

| | Presentation Time | Accuracy of Voice Recognition | GUI Revision | Manual Revision |
|---|---|---|---|---|
| CONVENTIONAL METHOD | 6 MINUTES 05 SECONDS | 79% | 0% | 21% |
| METHOD OF PRESENT INVENTION (WITHOUT MASTER SUBTITLE) | 5 MINUTES 53 SECONDS | 82% | 6% | 12% |
| METHOD OF PRESENT INVENTION (WITH MASTER SUBTITLE) | 6 MINUTES 13 SECONDS | 83% | 11% | 7% |

SUBTITLE GENERATION AND RETRIEVAL COMBINING DOCUMENT PROCESSING WITH VOICE PROCESSING

CROSS-REFERENCE TO RELATED APPLICATIONS

This application is a division of, and claims priority from, commonly-owned, co-pending U.S. patent application Ser. No. 11/338,100 filed on Jan. 23, 2006, which claims priority to foreign-filed application Japan 2004-369784, filed on Dec. 21, 2004, of which the benefit of the priority filing date is claimed and which is hereby incorporated by reference in its entirety as if fully set forth herein.

FIELD OF THE INVENTION

The present invention relates to a subtitle generation apparatus which recognizes voice in a presentation to generate subtitles thereof, and to a retrieval apparatus and the like for retrieving character strings by use of the subtitles.

BACKGROUND ART

In recent years, presentations that utilize presentation software have become popular. Such presentations are usually conducted in the following manner: first, presentation software is operated by a personal computer and the like to create page-type rich or plain electronic documents (hereinafter referred to as "presentation documents") that are displayed at the time of a presentation. Actual presentations that use these presentation documents are also conducted by operating presentation software with the personal computer or the like to display the presentation documents in a sequential manner by use of its slide show function.

Meanwhile, in order to ensure accessibility for people with hearing difficulties and for elderly people, there has been in recent years a movement to add subtitles to information originated in the form of voice. For example, with respect to information transmitted through broadcasts, there is a concrete goal of adding subtitles to all of the broadcast programs in which subtitles should be added by 2007.

Because of this background, it appears to be highly necessary to add subtitles to voice in a presentation as well. This is because although characters are present in presentation documents, they only provide fragmentary information in many cases and because a presenter does not always make a presentation according to his/her presentation document.

The method of adding such subtitles involves an automatic subtitle creation by use of voice recognition technology. However, the current voice recognition technology cannot create completely accurate subtitles. For this reason, editors must check and edit the result of voice recognition in the end. This kind of editing work has conventionally been performed by hand. To be more specific, editors manually amend the result of the voice recognition while listening to a playback of the corresponding voice.

However, this method has required a great number of editing processes, and has had a significant influence on the cost of the creation of subtitles. In addition, the efficiency of a manual editing depends largely on the level of skill of individual editors. Thus, an attempt to efficiently acquire the subtitle has increased the cost. Moreover, there is a report that long hours of manual operation place an enormous burden on editors.

Meanwhile, presentation software sometimes has a function of embedding caption information (hereinafter referred to as "speaker note") in the pages of a presentation document. When the content of an exemplary presentation, conducted by a master speaker who uses the presentation document, is embedded in the presentation document as the speaker note, many people can readily imitate the presentation of the master speaker. In addition, when a presenter previously embeds the content of his/her presentation in the presentation document, the presenter can use it later as a note for his/her presentation. Conventionally, such speaker notes have also generally been taken by hand as in the case of the subtitle editing work. Moreover, the retrieval of desired scenes and words from the record of presentation has also been conducted see: see Patent Documents: Japanese Patent Laid-Open No. Hei 07-182365; and Japanese Patent Laid-Open No. 2002-268667.

Specifically, the invention disclosed in Patent Document 1 creates retrieval files on the basis of, motion pictures, voice, pen-based input, mouse-based input and key-based input at an e-meeting, and one creates conference minutes while accessing the retrieval files and acquiring conference data.

Meanwhile, in the invention disclosed in Patent Document 2 a plurality of keywords are retrieved from text data in the presentation document or from voice in the presentation and registered. Page changing is then performed by voice input.

However, the conventional technologies including those disclosed in Patent Documents 1 and 2 have never established effective cooperation between voice recognition in a presentation and information about presentation documents.

For this reason, there has been a problem that the work of editing uncertain subtitles (hereinafter referred to as "subtitle candidates") that have been obtained as a result of voice recognition turns out wasteful. In addition, since the creation of speaker notes has been performed independently of voice recognition, there has been a problem that the creation of speaker notes is not efficient and the unnecessary cost is required.

Furthermore, since the retrieval processing has also been conducted by focusing on individual media such as voice and text data, there has been a problem that satisfactory results cannot be provided efficiently.

SUMMARY OF THE INVENTION

The present invention provides solutions to solve the foregoing technical problems. An aspect thereof is to establish effective cooperation between voice recognition in a presentation and information about presentation documents.

Another aspect of the present invention is to increase an efficiency of editing subtitles of the presentation.

Still another aspect of the present invention is to achieve efficient creation of the speaker notes.

Yet another aspect of the present invention is to achieve efficient provision of satisfactory results of retrieval of information about presentations.

In order to achieve the foregoing aspects, the present invention makes it possible to edit subtitles, which have been obtained as a result of recognition of voice in a presentation, by use of keywords that appear over the presentation document. To be more specific, the apparatus of the present invention is for recognizing voice in a presentation to generate a subtitle corresponding to that voice, the apparatus including extraction means for extracting keywords from document data used in the presentation; and processing means for generating the subtitle or assisting in generating the subtitle, by use of the keywords extracted by the extraction means.

BRIEF DESCRIPTION OF THE DRAWINGS

For a more complete understanding of the present invention and the advantage thereof, reference is now made to the following description taken in conjunction with the accompanying drawings.

FIG. 4 shows a display example provided by the subtitle generation apparatus in the embodiment of the present invention.

FIGS. 5A and 5B show an example of contents of a text attribute DB and a word attribute DB in the embodiment of the present invention.

FIG. 6 shows an example of contents of an attribute weight DB in the embodiment of the present invention.

FIG. 8 shows an example of contents of a keyword DB in the embodiment of the present invention.

FIGS. 9A and 9B show an example of contents of a subtitle DB and a page-time DB in the embodiment of the present invention.

DETAILED DESCRIPTION OF THE INVENTION

Figure 1:
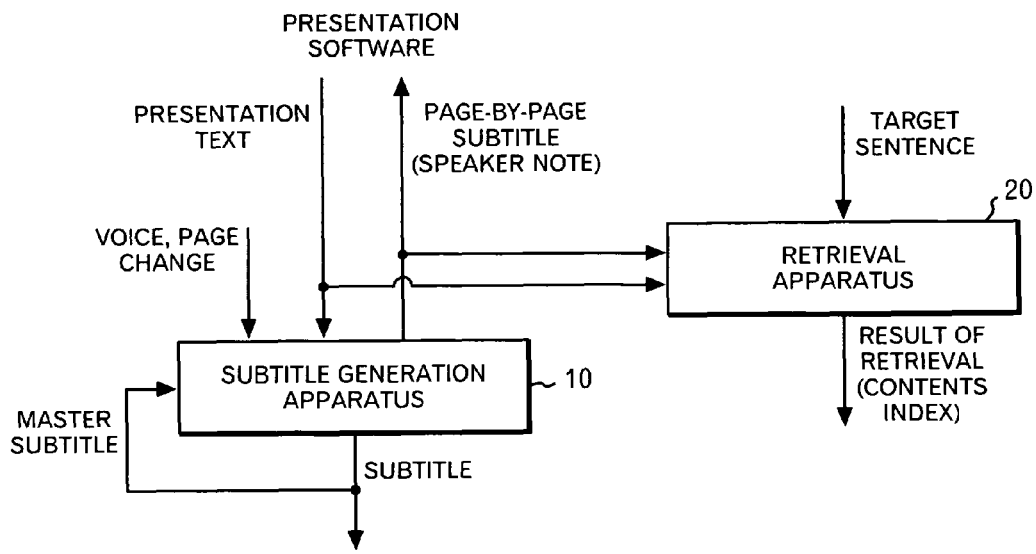
FIG. 1 is a block diagram showing a system configuration in an embodiment of the present invention.

The present invention provides methods, apparatus and systems to establish effective cooperation between voice recognition in a presentation and information about presentation documents. The present invention also provides methods, apparatus and systems to increase an efficiency of editing subtitles of the presentation, and to achieve efficient creation of speaker notes. The present invention further provides methods, apparatus and systems to achieve efficient provision of satisfactory results of retrieval of information about presentations.

In order to achieve the foregoing aspects, the present invention made it possible to edit subtitles, which have been obtained as a result of recognition of voice in a presentation, by use of keywords that appear over the presentation document. To be more specific, the apparatus of the present invention is for recognizing voice in a presentation to generate a subtitle corresponding to that voice, the apparatus including extraction means for extracting keywords from document data used in the presentation; and processing means for generating the subtitle or assisting in generating the subtitle, by use of the keywords extracted by the extraction means.

Here, the extraction means can assign weights to keywords, and the processing means can perform processing in consideration of the assigned weights. In addition, as the processing of generating subtitles by means of the processing means, the following processing can be envisioned: a processing of adding keywords that have been extracted by the extraction means to a voice recognition dictionary; or a processing of setting a dictionary, which is suitable for a category keyword that has been extracted by the extraction means, as the voice recognition dictionary. Meanwhile, as the processing of assisting in the creation of subtitles by means of the processing means, a processing of displaying, together with subtitles, keywords that have been extracted by the extraction means can be conceived.

Moreover, the present invention can be regarded as an apparatus for retrieving character strings. In such a case, the apparatus of the present invention includes storage means for storing first text data (subtitles) obtained by recognizing voice in a presentation, second text data (presentation text) extracted from document data used in the presentation, and associated information of the first text data and the second text data; and retrieval means for retrieving, by use of the associated information, character strings from text data composed of the first text data and the second text data.

Furthermore, the present invention can be regarded as a method of combining the information about a presentation document with voice recognition in a presentation. In such a case, the method of the present invention causes a computer to combine a processing of a document having a plurality of pages with a processing of voice generated with reference to the document, the method including the steps of causing the computer to determine, among subtitles obtained by recognizing the voice, a specific subtitle obtained by recognizing voice generated with reference to a specific page of the document, and causing the computer to store the correspondence between the specific subtitle and the specific page. Then, by utilizing the correspondence between the specific subtitle and the specific page, for example, the following processing is performed.

First processing: a processing of displaying the specific subtitle together with specific information about the specific page.

Second processing: a processing c-f embedding the specific subtitle in the specific page of the document.

Third processing: a processing of retrieving character strings, with the retrieval target range extended from the specific subtitle to text data contained in a specific page.

Furthermore, the present invention can be regarded as a program product for allowing a computer to realize a predetermined function. In such a case, the first program product of the present invention allows the computer to realize a function of extracting keywords from document data used in a presentation and a function of generating a subtitle corresponding to voice in the presentation or assisting in generating the subtitle, by use of the extracted keywords. In addition, the second program product of the present invention allows the computer to realize a function of determining, among subtitles obtained by recognizing voice generated with reference to a predetermined document, a specific subtitle obtained by recognizing voice generated with reference to a specific page of the document, and a function of storing the correspondence between the specific subtitle and the specific page.

With reference to the accompanying drawings, the best mode for implementing the present invention (hereinafter referred to as "embodiment") will be described below in detail.

FIG. 1 shows a configuration of a subtitle editing system of the present embodiment. The subtitle editing system includes a subtitle generation apparatus 10 and a retrieval apparatus 20. The subtitle generation apparatus 10 receives text data contained in a presentation document (hereinafter referred to as "presentation text"), voice in a presentation, page-changing events and master subtitles, and outputs subtitles and page-by-page subtitles (speaker notes). Here, the master subtitle means a subtitle obtained as a result of a presentation of a master speaker who used the same presentation document.

Meanwhile, the retrieval apparatus 20 receives page-by-page presentation text, page-by-page subtitles and target sentences (sentences to be retrieved), and outputs the result of the retrieval (contents index).

Figure 2:
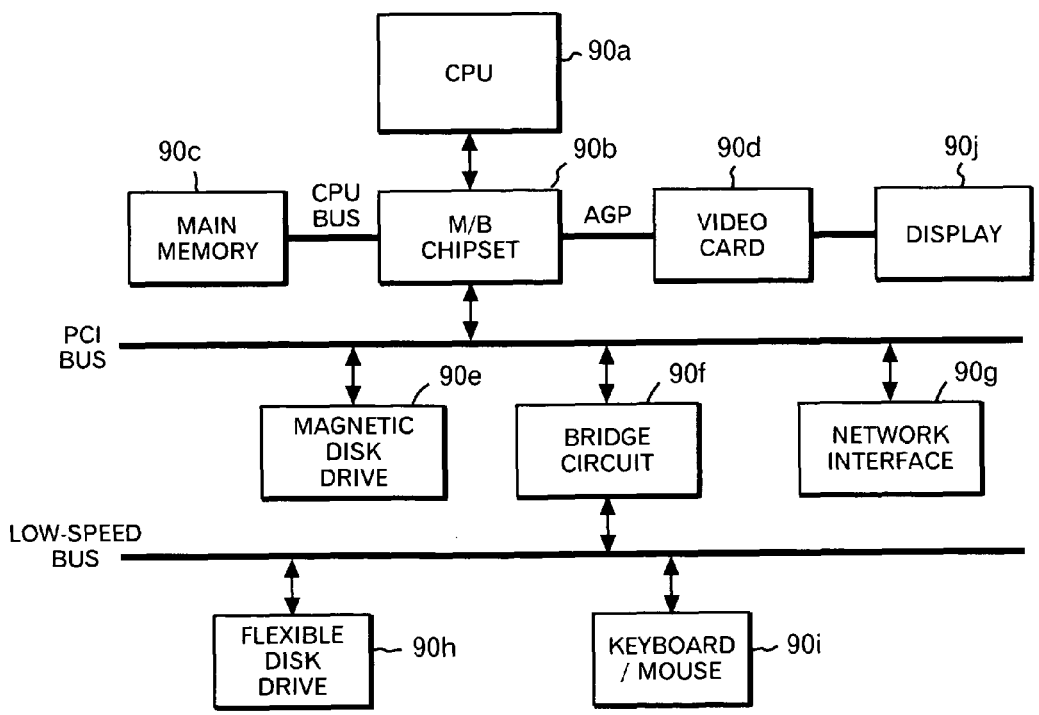
FIG. 2 is a block diagram showing a hardware configuration of a subtitle generation apparatus and a retrieval apparatus in the embodiment of the present invention.

FIG. 2 shows a schematic diagram of an example of a hardware configuration of a computer, suitably used as the subtitle generation apparatus 10 and the retrieval apparatus 20 in the present embodiment.

The computer shown in FIG. 2 includes a central processing unit (CPU) 90a, a calculation means; a main memory 90c connected to the CPU 90a through a mother board (M/B) chip set 90b and a CPU bus; and a video card 90d and a display 90j which are similarly connected to the CPU 90a through the M/B chip set 90b and an accelerate graphics port (AGP). The computer further includes a magnetic disk device (HDD) 90e connected to the M/B chip set 90b through a peripheral component interconnect (PCI) bus, and a network interface 90g. Furthermore, the computer includes a flexible disk drive 90h and a keyboard/mouse 90i which are connected, from the PCI bus, to the M/B chip set 90b through a bridge circuit 90f and a low-speed bus such as an industry standard architecture (ISA) bus.

It should be noted that FIG. 2 merely illustrates a hardware configuration of a computer that implements the present embodiment by way of example and, therefore, other different configurations can be employed as long as they are applicable to the present embodiment. For example, instead of providing the video card 90d, only video memories may be mounted on the computer to allow the CPU 90a to process an image data. As an external storage device, a compact disc recordable (CD-R) drive or a digital versatile disc random access memory (DVD-RAM) drive may be provided through an interface such as the AT attachment (ATA) or the small computer system interface (SCSI).

Next, the subtitle generation apparatus 10 of the present embodiment will be described in detail.

Figure 3:
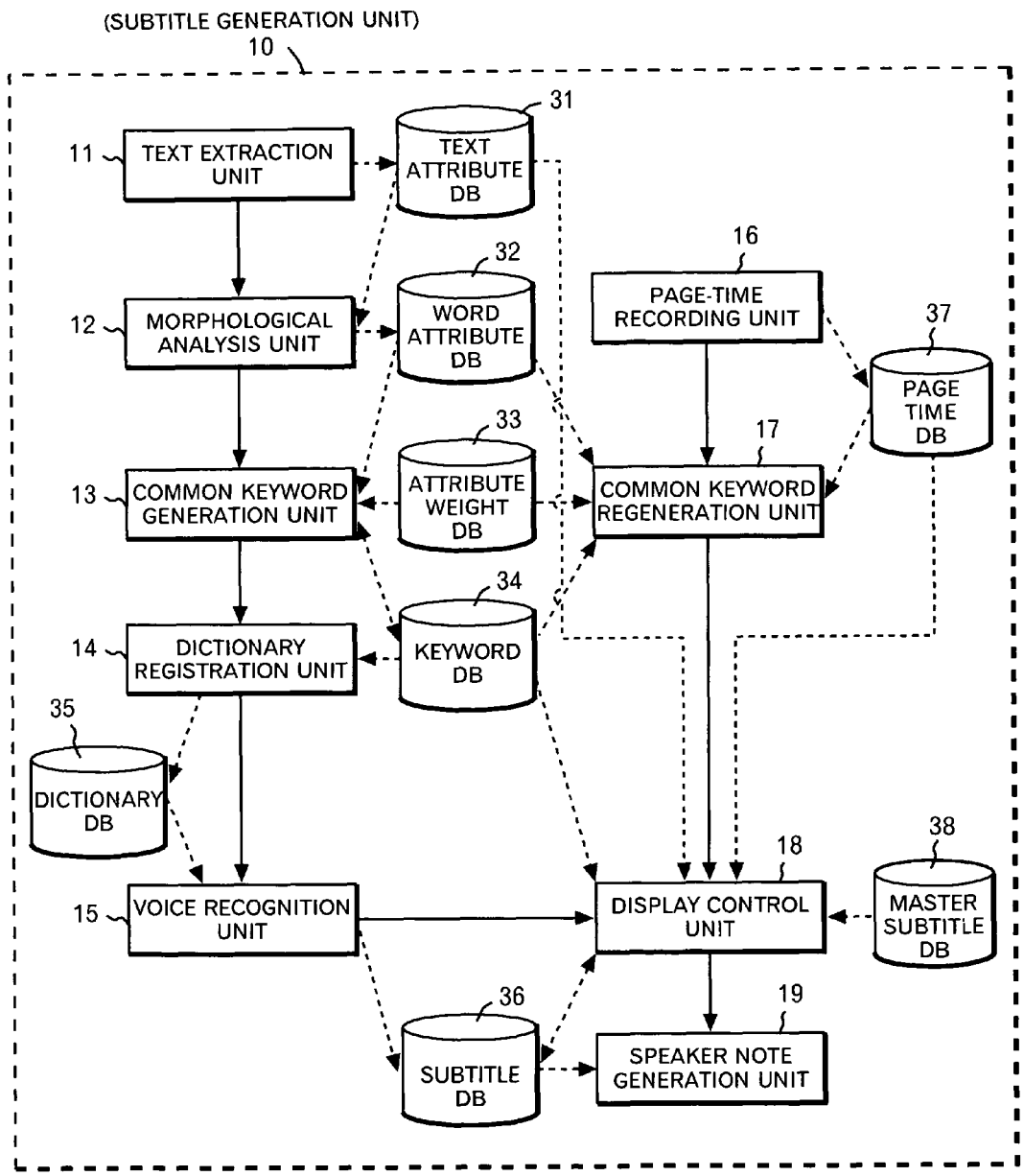
FIG. 3 is a block diagram showing a function configuration of the subtitle generation apparatus in the embodiment of the present invention.

FIG. 3 is a diagram showing a function configuration of the subtitle generation apparatus 10 of the present embodiment. The subtitle generation apparatus 10 includes a text extraction unit 11, a morphological analysis unit 12, a common keyword generation unit 13, a dictionary registration unit 14, a voice recognition unit 15, a page-time recording unit 16, a common keyword regeneration unit 17, a display control unit 18 and a speaker note generation unit 19. The subtitle generation apparatus 10 further includes a text attribute database (hereinafter referred to as "DB") 31, a word attribute DB 32, an attribute weight DB 33, a keyword DB 34, a dictionary DB 35, a subtitle DB 36, a page-time DB 37 and a master subtitle DB 38.

The text extraction unit 11 has a function of extracting presentation text and its attribute from presentation documents. The text attribute DB 31 stores the extracted presentation text and its attribute.

The morphological analysis unit 12 has a function of morphologically analyzing the presentation text stored in the text attribute DB 31 and decomposing it into words. The word attribute DB 32 stores the words, obtained as a result of decomposition, and their attributes.

The attribute weight DB 33 stores presentation text attributes and their assigned weights. The common keyword generation unit 13 has a function of assigning weights to words stored in the word attribute DB 32 with reference to the attribute weight DB 33. Moreover, the keyword DB 34 stores the weighted words as keywords.

Note that, the text extraction unit 11, the morphological analysis unit 12 and the common keyword generation unit 13 can be regarded as "extraction means" because they extract certain information from presentation documents. In addition, the common keyword generation unit 17 to be described later may be regarded as included in the "extraction means".

The dictionary registration unit 14 has a function of adding keywords stored in the keyword DB 34 to the dictionary DB 35 that is consulted at the time of voice recognition. The voice recognition unit 15 has a function of performing voice recognition in consultation with the dictionary DB 35. Furthermore, the subtitle DB 36 stores, together with time, the result of voice-recognition as a subtitle.

The page-time recording unit 16 has a function of detecting page-changing events and storing them as timestamps. The page-time DB 37 stores the correspondence between page and time.

The common keyword regeneration unit 17 has a function of regenerating common keywords while consulting not only the word attribute DB 32 and the attribute weight DB 33, but also the page-time DB 37.

The master subtitle DB 38 stores master subtitles on a page-by-page basis. The display control unit 18 displays the correspondence between the subtitle and time stored in the subtitle DB 36, and has a function of causing keywords stored in the keyword DB 34, presentation text stored in the text attribute DB 31 and a master subtitle stored in the master subtitle DB 38 to cooperate together for display. Note that, the dictionary registration unit 14 and the display control unit 18 can be regarded as "processing means" because they process the generation of subtitles or assist in generation of subtitles.

The speaker note generation unit 19 has a function of generating speaker notes from subtitles stored in the subtitle DB 36 and embedding them in presentation documents. The speaker note generation unit 19 may be regarded as "registration means" because it performs registration of speaker notes.

It should be noted that these functions can be realized when software and hardware resources cooperate together. To be more specific, these functions can be realized when the CPU 90a of the subtitle generation apparatus 10 loads programs, which realize the functions of the text extraction unit 11, the morphological analysis unit 12, the common keyword generation unit 13, the dictionary registration unit 14, the voice recognition unit 15, the page-time recording unit 16, the common keyword regeneration unit 17, the display control unit 18 and the speaker note generation unit 19, from the magnetic disk device 90e to the main memory 90c, for example.

The subtitle generation apparatus 10 with such a function configuration provides a display as shown in FIG. 4. As shown in FIG. 4, the screen is provided with a subtitle candidate display region 10a, a common keyword list display region 10*b*, a presentation text display region 10*c* and a master subtitle display region 10*d*.

The subtitle candidate display region 10*a* displays the following recognized voice: "koremadeno IBM no torikumiwa ON DEMAND BUSINESS wo jitsugensuru uedeno katei ni sugimasen" (The efforts of IBM made so far are just in the process of realizing on demand business), which is decomposed into minimum character sting unit (hereinafter referred to as "subtitle line") on the basis of morphological analysis. The "line" column indicates the line number of each subtitle line counted from the top of the relevant voice file. The "start" column indicates in how many seconds voice corresponding to the subtitle lines are reproduced by the count from the top of the voice file.

The common keyword list display region 10*b* displays a certain number of keywords that appear in the presentation document in descending order of weight. The presentation text display region 10*c* displays presentation text contained in the pages corresponding to the subtitles displayed on the subtitle candidate display region 10*a*. The master subtitle display region 10*d* displays master subtitles that have been obtained from the past presentations including pages corresponding to the subtitles displayed on the subtitle candidate display region 10*a*.

Next, the operation of the subtitle generation apparatus 10 will be described.

(Operation Prior to Presentations)

Firstly, the text extraction unit 11 receives from presentation software presentation text and its attribute which are contained in the presentation document, and stores them in the text attribute DB 31 on a page-by-page basis. Here, the term "attribute" means, for example, the following information: whether or not text represents a title; character size of text; whether or not text is decorated (e.g., underlined).

Consequently, information as shown in, for example, FIG. 5A is stored in the text attribute DB 31. Note that, as the attributes for the presentation text, there may be two or more attributes for the presentation text, like the attribute for the sentence "accessibility no igi" (meaning of accessibility). In such a case, all attributes are assumed to be stored in the text attribute DB 31.

The morphological analysis unit 12 morphologically analyzes the presentation text stored in the text attribute DB 31, decomposes it into words and stores them in the word attribute DB 32. Note that, since a publicly known morphological analysis method can be used, a detail description thereof is omitted here.

In this way information as shown in FIG. 5B is stored in the word attribute DB 32, for example.

Upon completion of storing information in the word attribute DB 32, the common keyword generation unit 13 starts an operation of determining keywords that are common in the presentation document. Sometimes there is a case where main contents of a page of the presentation document are images and the like and therefore character strings with meanings cannot be extracted. For this reason, keywords that are common over the presentation document are extracted.

The common keyword generation unit 13 selects keywords while assigning weights to words in accordance with the attributes of the words. Here, a description will be provided for the attribute weight DB 33 in which the correspondence between the attribute and weight is previously stored.

FIG. 6 shows an example of the attribute weight DB 33. Weights are defined for attributes such as title, character size, underlined character, boldface character and the like. For instance, the attribute weight DB 33 can determine, with respect to the same characters, that those with larger character size are important keywords and that they are more important when used as a title. Note that, "alternative text" shown in this drawing means character strings provided for images and the like. Although these character stings are never be visualized at the time of a slide show and the like, they are visualized in accordance with specific operations.

Next, the operation of the common keyword generation unit 13 will be described in detail.

Figure 7:
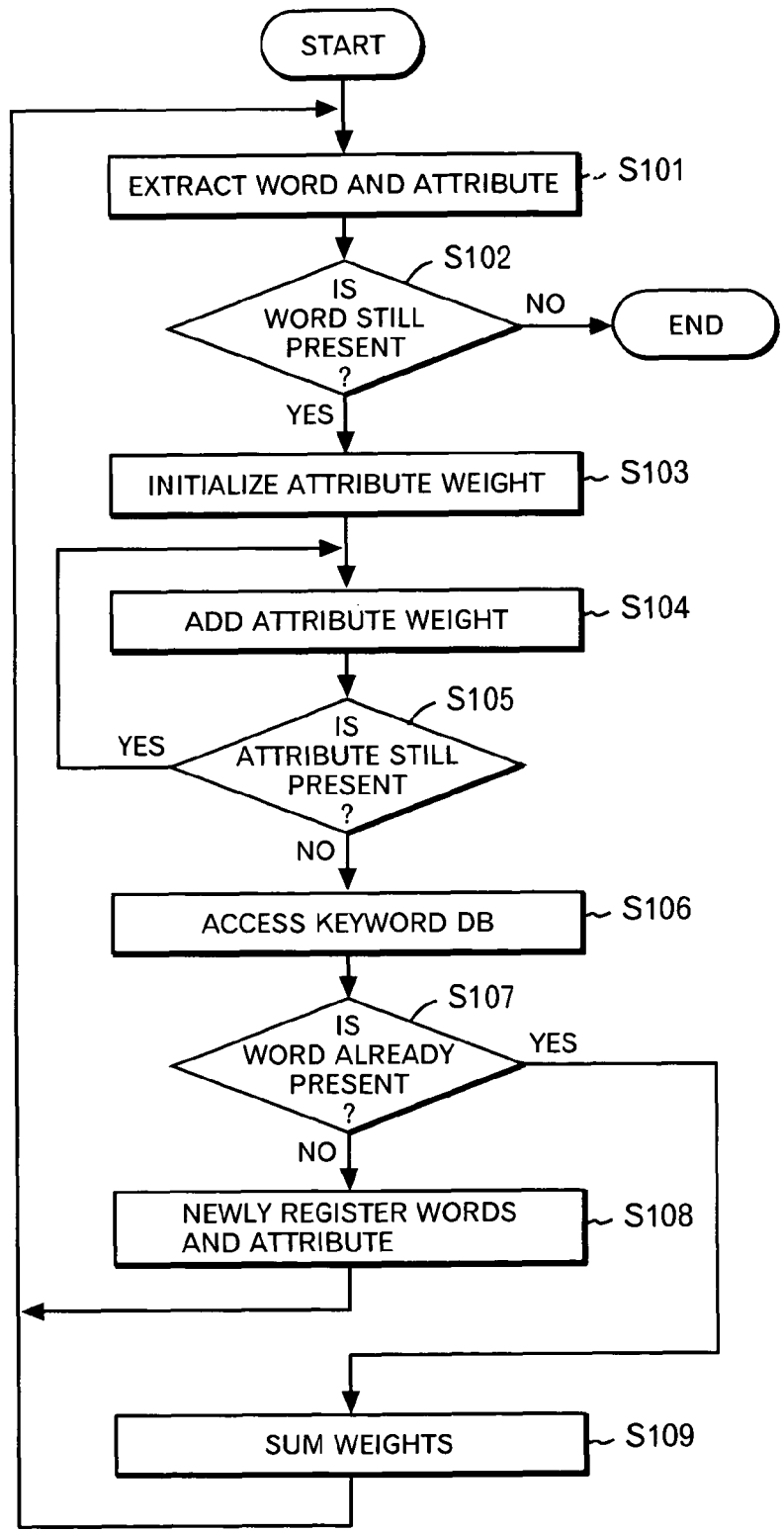
FIG. 7 is a flowchart showing an operation of a common keyword generation unit in the embodiment of the present invention.

FIG. 7 is a flowchart showing an operation of the common keyword generation unit 13.

Firstly, the common keyword generation unit 13 extracts words and their attributes from the word attribute DB 32 (Step 101). Next, a determination is made as to whether or not words are still present (Step 102). In other words, the common keyword generation unit 13 determines whether or not a word has been successfully extracted in the Step 101.

When it is determined that the extraction of a word has failed, then the processing ends. On the other hand, when it is determined that the extraction of a word has been successful: the attribute weights of the word are initialized (Step 103), and attribute weights are extracted from the attribute weight DB 33 and summed (Step 104). Note that; since the number of the attribute is not necessarily one, a determination is made as to whether or not an attribute is still present (Step 105). When it is determined that an attribute is still present, then the Step 104 is repeated, i.e., as many weight summation operations as the number of the attributes are performed.

Once the values of weights are determined, the keyword DB 34 is accessed (Step 106) and it is determined whether or not the words are already present (Step 107).

When it is determined that the words are not present, the words and attributes are newly registered (Step 108). On the other hand, when it is determined that the words are already present, newly calculated weights are added to the weights that has been already summed for the words (Step 109).

In this way the key word DB 34 stores the information as shown, for example, in FIG. 8. Here, keywords are sorted in descending order of weight before they are stored in the keys word DB 34.

The dictionary registration unit 14 adds the keywords registered in the keyword DB 34 to the dictionary DB 35. Note that, a technology publicly known in the field of a voice recognition engine can be used for the addition of keywords to the dictionary.

(Operation at the Time of Presentation)

When a presenter makes a presentation, the voice recognition unit 15 recognizes the voice in the presentation in consultation with the dictionary DB 35. To be more specific, the voice recognition unit 15 acquires the correspondence between the lapse of time from the start of the presentation and the result of voice recognition every moment. The correspondence between time and the result of voice recognition is stored in the subtitle DB 36. Note that, the voice recognition can also be performed by use of a publicly known technology.

Thus, information as shown in FIG. 9A is stored in the subtitle DB 36.

At a presentation, a presenter or others change pages according to the voice in the presentation. The page-time recording unit 16 then detects a page-changing event and stores the correspondence between page and time in the page-time DB 37.

In this way information as shown in FIG. 9B is stored in the page-time DB 37. Herein, times when pages are turned are recorded.

Note that, the time recorded here may be counted from the start of the presentation, like the time acquired by the voice recognition unit 15. For example, the following method can be envisioned: the subtitle generation apparatus 10 starts a timer upon receipt of an instruction to start the presentation, and thus the voice recognition unit 15 and the page-time recording unit 16 share the count values of the same timer.

Subsequently, the common keyword regeneration unit 17 performs another weight-assigning operation for keywords by use of the information stored in the page-time DB 37.

Figure 10:
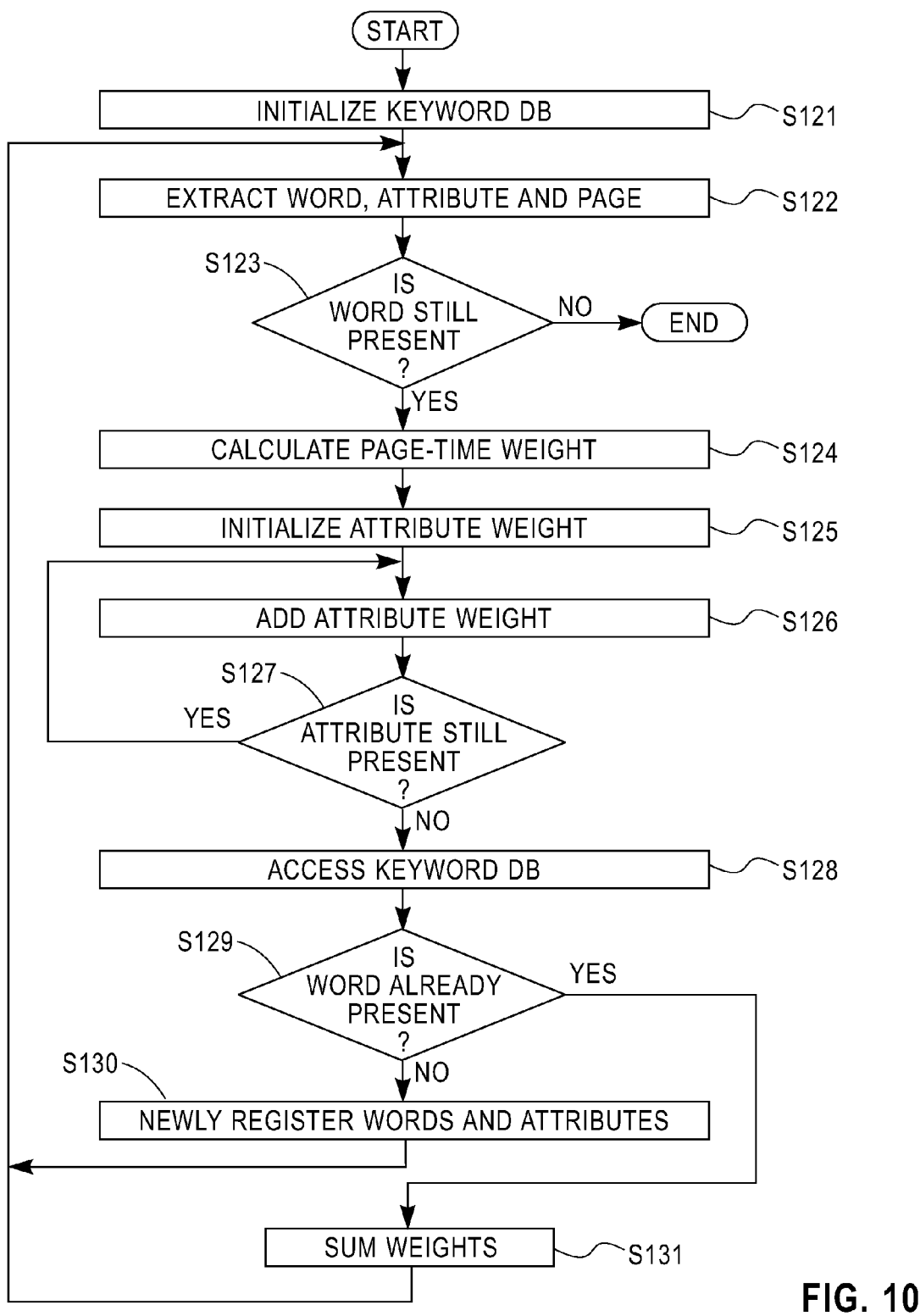
FIG. 10 is a flowchart showing an operation of a common keyword regeneration unit in the embodiment of the present invention.

FIG. 10 is a flowchart showing an operation of the common keyword regeneration unit 17 in that case.

Firstly, the common keyword regeneration unit 17 initializes the keyword DB 34 (Step 121). The common keyword regeneration unit 17 then extracts a word, an attribute of the word and the information about the page where the words appeared (Step 122) from the word attribute DB 32. Next, a determination is made as to whether or not a word is still present (Step 123). In other words, the common keyword regeneration unit 17 determines whether or not a word has been extracted successfully in the Step 122.

When it is determined that extraction of a word has failed, then the processing ends. On the other hand, when it is determined that extraction of a word has been successful, the page-time DB 37 is accessed to calculate the weight, which is based on the duration during which the page in question is displayed in the presentation (Step 124).

It should be noted that since the correspondence between a page and the time when the page is turned is recorded in the page-time DB 37, the period during which a certain page has been displayed can be found by extracting, the time when the page is turned and the time when the next page is turned. When the duration while a certain page has been displayed is extremely close to zero, it is assumed that the page has not been displayed. Weights are not assigned to such words that appear only in such a page. This is because it can be determined that it is highly likely that words appeared only in the non-displayed pages never appear as the voice in the presentation. To be more specific, the common keyword regeneration unit 17 more generally performs weight-assigning operations depending on the number of times when keywords appeared as the voice in the presentation.

In addition, various known calculation methods can be adopted as a method of finding weights on the basis of the duration while a page has been displayed. Examples thereof include a calculation method based merely on the proportionality relation, as well as calculation methods using exponential functions and quadratic functions.

The attribute weights of the words are then initialized (Step 125), and an attribute weight is extracted from the attribute weight DB 33 and summed (Step 126). Note that; since the number of the attribute is not necessarily one, a determination is made as to whether or not an attribute is still present (Step 127). When it is determined that an attribute is still present, then the Step 126 is repeated, i.e., as many weight summation operations as the number of the attributes are performed.

Once the values of weights are determined, the keyword DB 34 is accessed (Step 128) and it is determined whether or not the words are already present (Step 129).

When it is determined that the words are not present, the words and attributes are newly registered (Step 130). On the other hand, when it is determined that the words are already present, newly calculated weights are added to the weights that has been already summed for the words (Step 131).

Incidentally, the keywords created in this way can be defined as "words that have been determined, based on time and attribute weights, to represent a high level of importance among words contained in the version set of presentations." Note that, the term "version set of presentations" means a set of a plurality of presentations where the same presentation documents are used. This is because a presentation is performed not necessarily once even when the same presentation document is used. Since whether or not the weights are advantageous to the selection of the common keywords may be different depending on the version of the presentation, weight-assigning operations can be performed with such a fact taken into consideration.

Herein, TF', a weight for a common keyword, can be specifically represented by the mathematical expression described below, where Wv represents a weight based on the version of the presentation, Wt represents a weight based on the attribute of each word. In addition, t represents a word, tp represents an array of the duration while each page has been displayed, and tpi represents the duration while a specific page has been displayed, which is obtained from tp. Furthermore, Nr represents the number of presentations, Np represents the number of pages and Na represents the number of the word "t" present in each page. TF' .function. (t, tp)=Nr*Wv(Np*((Na*Wt)tpi)) [Equation **1]

Note that, a method similar to this includes the TF-IDF (TFIDF) method. The TF-IDF method becomes a basis for many of the methods, which retrieve information based on keywords from the Internet. Here, TF stands for Term Frequency, representing the appearance ratio of a word in a specific document. IDF stands for Inverted Document Frequency, representing the singularity of a word. The TF-IDF represents the level of importance of a word in a document based on these indices.

Here, in the TF-IDF method, the level of importance of a word is specifically represented by the mathematical expression described below, where t represents a word, tf represents the number of the word "t" present in a document, N represents the number of documents and n represents the number of documents containing the word "t". TFIDF(t)=tfidf [Formula 1]idf=log(N/n)

Here, a supplementary explanation will be provided for the difference between the method of the present embodiment and the TF-IDF method.

(1) The method of the present embodiment identifies a keyword itself in a presentation document group (presentation group). However, the TF-IDF method determines for which document the keyboard is important.

(2) The method of the present embodiment assigns a weight to the keyword with its attribute taken into consideration, whereas the TF-IDF method does not.

(3) All pages of the presentation document may not be used in the actual presentations, and all pages may not be used evenly. For this reason, the method of the present embodiment assigns a weight to the keyword with the presentation duration of the page that contains the keyword taken into consideration. By contrast, the TF-IDF method never performs such weight-assigning operations.

(4) As described above, presentations are not necessarily conducted once. That is, a version set of presentations are produced. For this reason, the method of the present embodiment assigns a weight using not only a single presentation document but also a version set of presentations. By contrast, the TF-IDF method never performs such weight-assigning operations.

(5) As described above, the advantage of the presentation may be different depending on the version of the presentation. Accordingly, the method of the present embodiment performs weight-assigning operations with the version of the presentation where keywords appeared taken into consideration. By contrast, the TF-IDF method never performs such weight-assigning operations.

(Operation after Presentations)

When a presentation finished, the display control unit 18 performs a control operation to cause the display 90*j* to provide a display as shown in FIG. 4. Specifically, the display control unit 18 reads the correspondence between time and the result of voice recognition from the subtitle DB 36, and displays it on the subtitle candidate display region 10*a*. Moreover, keywords are read from the keyword DB 34 and displayed on the common keyword list display region 10*b*. Furthermore, the page-time DB 37 is accessed and thereby the page corresponding to the result of voice recognition is specified on the basis of the time information. The presentation text contained in the page is read out from the text attribute DB 31 and displayed on the presentation text display region 10*c*. The master subtitle about the page is then read out from the master subtitle DB 38 and displayed on the master subtitle display region 10*d*.

Note that, as described above, the master subtitle means a subtitle obtained by recognizing voice in the presentation using the same presentation document. The following can be cited as the case where the same presentation document is used again.

A. A maker makes a presentation about their developed products. Following this, independent software vendors (ISV) or others then make similar presentations in their respective business opportunities.

B. The same presentations about lectures, sessions or the like are performed in multiple classes due to limitation of capacity and classification of students. Alternatively, lectures of a certain academic year are similarly conducted in the next academic year.

C. The content of a presentation made by some employees of a company is handed over to a subordinate or a colleague.

D. A rehearsal of an important presentation is previously made for the creation of subtitles, facilitating a smooth addition of subtitles in an actual presentation by means of the method of the present invention to be described later.

Even when presentations are conducted using the same presentation document as described above, there has been no choice but to edit subtitles for each presentation in the past. However, in the present embodiment such master subtitles can assist in the latest editing of the subtitles.

As previously mentioned, the display control unit 18 displays, with respect to subtitle candidates of a certain page, the presentation text and the master subtitle of the page. For this reason, when a focus on the subtitle candidates moved onto another page, the display control unit 18 performs a control operation to change the display of the presentation text and the master subtitle in conjunction with such movement of the focus.

Figure 11:
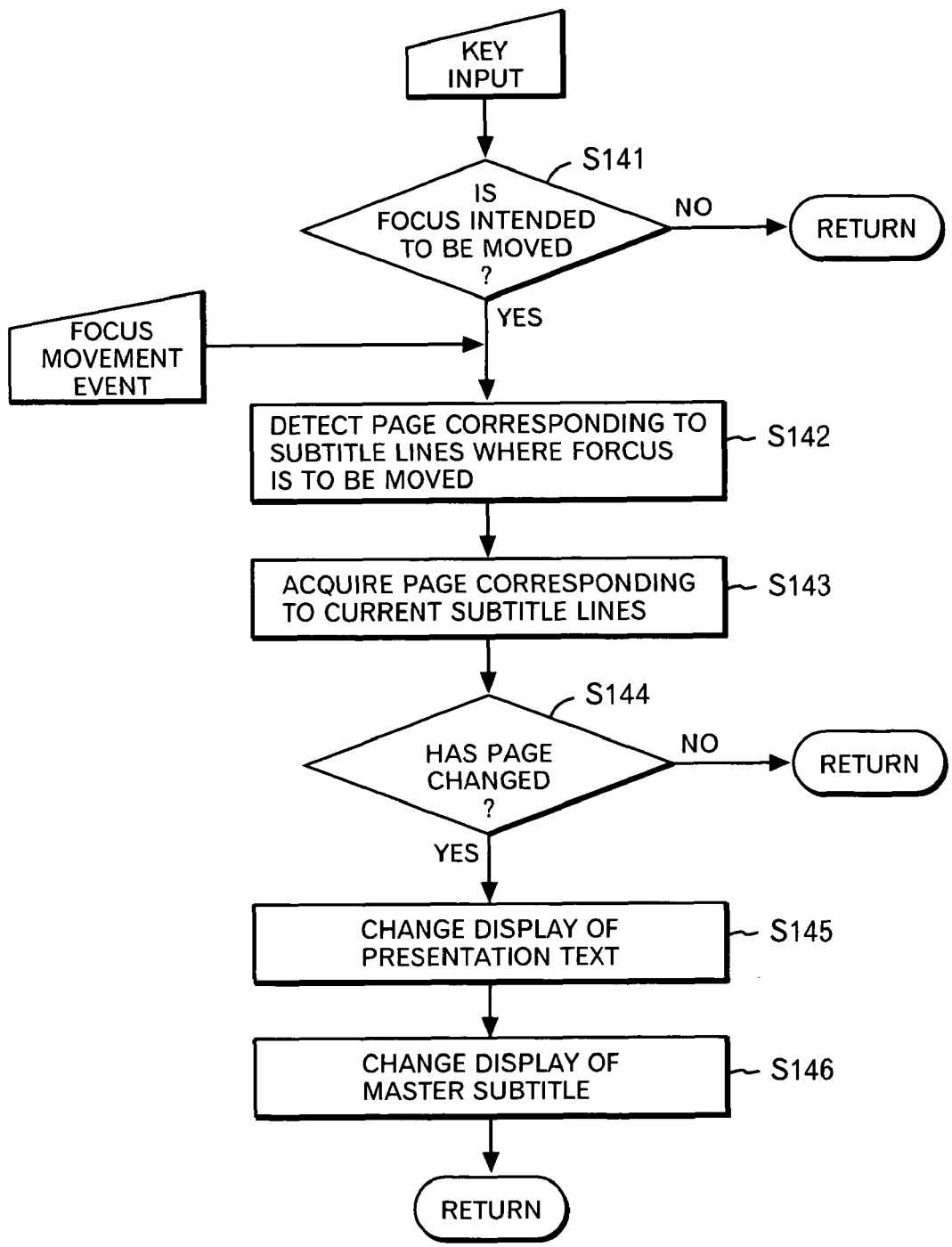
FIG. 11 is a flowchart showing an operation of a display control unit in the embodiment of the present invention at the time when a focus cooperates.

FIG. 11 is a flowchart showing an operation of the display control unit 18 in that case.

At first, upon receipt of key input from a user, the display control unit 18 determines whether or not the key input is intended for the movement of a focus (Step 141). When it is determined that the key input is not intended for focus movement, the processing goes back to the step before the interruption of the key input, followed by the processing as instructed by the key input.

On the other hand, when it is determined that the key input is intended for focus movement or that the key input is intended for an event (e.g., mouse event) of other focus movements, the page, corresponding to the subtitle lines where a focus is to be moved, is detected (Step 142). To be more specific, since the correspondence between time and subtitle is stored in the subtitle DB 36, the time corresponding to the subtitle line where a focus is to be moved is acquired from it in the first place. Since the correspondence between time and page is stored in the page-time DB 37, the page corresponding to the time is acquired from it.

In addition, the page corresponding to the current subtitle line is also acquired (Step 143). A page that has been already acquired in the manner similar to that in the Step 142 and stored in a memory can be used as it is, if any.

The display control unit 18 then determines whether or not the page containing newly focused subtitle lines has been changed from the previous page (Step 144).

When it is determined that the page has not been changed, then the processing goes back to the step before the interruption of key input. On the other hand, when it is determined that the page has changed, then the display of the presentation text is changed to a display that corresponds to the new page (Step 145), and the master subtitle is also changed automatically corresponding to the new page (Step 146).

In the present embodiment, as described above, the subtitle candidates, the presentation text and the master subtitle cooperate together for display, and the keyword list is also displayed. In this way, they assist in the editing of subtitles. The subtitles thus edited are to be stored in the subtitle DB 36.

It should be noted that various methods can be adopted as the GUI operation for revising the subtitle candidates in consultation with the common keyword list, the presentation text and the master subtitle. Typical examples of such a GUI operation include right click, drag & drop, function keys and specially assigned command keys.

Moreover, in the present embodiment, the speaker note generation unit 19 divides the subtitles that has been thus edited on a page-by-page basis and thereby creates speaker notes, and these speaker notes can be embedded in the corresponding pages of the presentation document.

Figure 12:
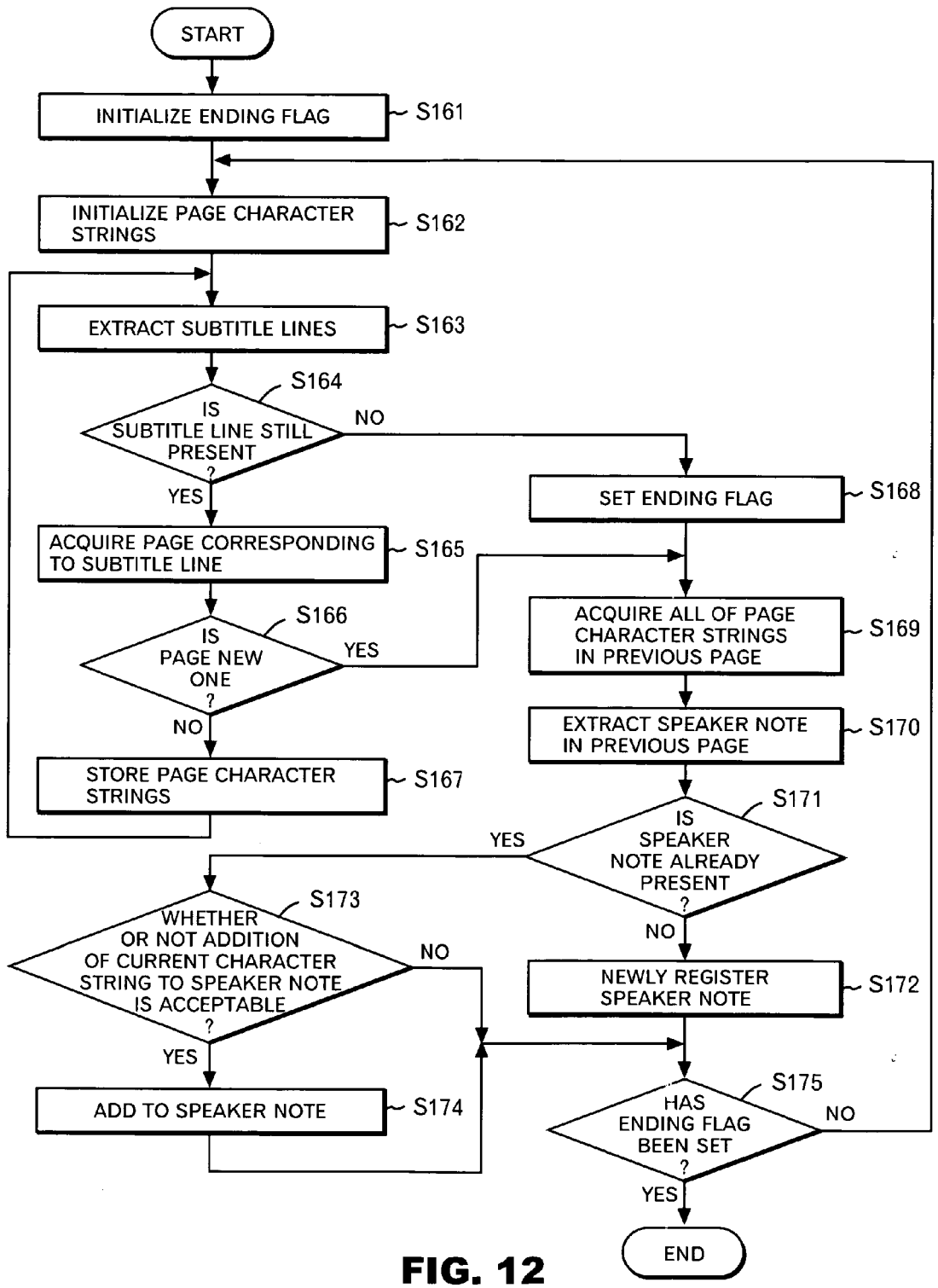
FIG. 12 is a flowchart showing an operation of a speaker note generation unit in the embodiment of the present invention.

FIG. 12 is a flowchart showing an operation of the speaker note generation unit 19 in that case.

At first, the speaker note generation unit 19 initializes an ending flag (Step 161). Here the term "ending flag" means a flag indicating whether or not a subtitle line to be extracted from the subtitle DB 36 is the last.

Next, the speaker note generation unit 19 initializes a region storing subtitle character strings on a page-by-page basis (hereinafter referred to as "page character strings"), i.e., a page character strings storing region (Step 162).

Subtitle lines are then extracted from the subtitle DB 36 (Step 163), and a determination is made as to whether or not a subtitle line is still present (Step 164). In other words, the speaker note generation unit 19 determines whether or not subtitle lines have been successfully extracted.

As a result, when it is determined that the extraction of a subtitle line has been successful, then the page corresponding to the subtitle line is specified (Step 165). A determination is then made as to whether or not the page is a new page (Step 166). When it is determined that the page is not the new page, then the subtitle lines that have been extracted in the Step 163 are stored in the page character strings storing region (Step 167). The processing then goes back to the Step 163, and another round of extraction of subtitle lines and storing of them into the page character strings storing region is repeated.

Meanwhile, when it is determined that the extraction of a subtitle line in the Step 164 has failed, the ending flag is then set (Step 168) and the processing proceeds to the Step 169.

When it is determined that the page is the new page in the Step 166, the processing proceeds to the Step 169, instead of proceeding to the Step 167.

All of the page character strings in the previous page (the page that had been focused) are then extracted from the page character strings storing region (Step 169). In addition, a speaker note is extracted from the page of a presentation document (Step 170), and a determination is made as to whether or not the speaker note is already present (Step 171), i.e., a determination is made as to whether or not the extraction of the speaker note has been successful.

When it is determined that the extraction of the speaker note has failed, current page character strings are newly embedded in a page as a speaker note (Step 172). To be more specific, the presentation software receives the speaker note and embeds them in the corresponding page of the presentation document.

On the other hand, when it is determined that the extraction of the speaker note has been successful, a check is made as to whether or not the addition of the current character string to the extracted speaker note is acceptable (Step 173). Note that, publicly known methods can be used for this check, and therefore the description thereof will be omitted herein.

When it is determined that the addition of the current character string is acceptable, the current character string is then added to the already-embedded speaker note (Step 174), and the processing proceeds to the Step 175. To be more specific, the presentation software receives speaker notes and embeds them in the corresponding page of the presentation. Meanwhile, when current character string is not intended to be added to the speaker note, then the processing proceeds to the Step 175 instead of proceeding to the Step 174.

Finally, the speaker note generation unit 19 determines whether or not the ending flag is set (Step 175). When it is determined that the ending flag has been set, then the processing ends. However, when it is determined that the ending flag has not been set, then the processing goes back to the Step 162 and similar processing is repeated. The description of the subtitle generation apparatus 10 shown in FIG. 3 is complete.

Incidentally, in the present embodiment the keywords created by the common keyword generation unit 15 are added to the dictionary DB 35 in advance, and the voice recognition is performed by use of these keywords. It is not, however, uncommon to see a case where there is not much time to register information about the content of a presentation beforehand by use of a function of previously adding common keywords to a voice recognition dictionary. In such a case, errors occur mainly in the recognition of technical terms. To prevent such recognition errors, necessary words and the like are subsequently added to the voice recognition dictionary by use of the common keywords and the like, and thus another recognition operation can be performed again by use of the fragmentary voice corresponding to the erroneously recognized portions. In that way most of the results of voice recognition can be automatically corrected. Here, various fragmentary voice ranges can be envisioned, such as phrases, punctuated segments, sentences, paragraphs and entirety of the voice data. Generally, a longer voice duration increases the accuracy of voice recognition.

Next, a modified example of the subtitle generation apparatus 10 of the present embodiment will be described.

Although the dictionary registration unit 14 which adds common keywords stored in the keyword DB 34 to the dictionary DB 35 is provided in FIG. 3, a dictionary switching unit may provided instead of this. The dictionary switching unit has a function of assigning a category dictionary, which is suitable for the keywords stored in the keyword DB 34, as a voice recognition dictionary among a plurality of category dictionaries prepared. For example, it is assumed that dictionaries of categories such as computer, business and welfare are prepared as category dictionaries. Since it can be learned from the common keyword list shown in FIG. 4 that this presentation relates to computers and accordingly, a category dictionary for the computer is selected.

Figure 13:
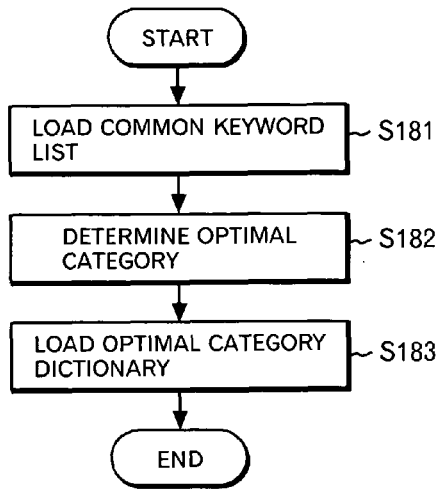
FIG. 13 is a flowchart showing an operation of a dictionary switching unit in the embodiment of the present invention.

FIG. 13 is a flowchart showing an operation example of the dictionary switching unit. At first, the dictionary switching unit loads the common keyword list (Step 181). Next, the dictionary switching unit determines the optimal category on the basis of this common keyword list (Step 182). The dictionary switching unit then loads the dictionary DB 35, which is the optimal category dictionary. Thereby, the dictionary of the voice recognition engine is switched (Step 183). This procedure is also expected to increase the accuracy of voice recognition.

Note that, dictionary registration and dictionary switching are to be conducted prior to a presentation in the aforementioned description. However, in such a case that there is no time to conduct dictionary registration or dictionary switching before a presentation, a configuration may be adopted where dictionary registration or dictionary switching is conducted after a presentation. Specifically, dictionary registration or dictionary switching may be conducted after a presentation, and voice recognition is performed again by use of the voice data acquired and stored at the presentation. Alternatively, the follow-up voice recognition may be performed only for the erroneously recognized portions, not for the entire voice data. It should be noted that the erroneously recognized portions can be identified on the basis of the certainty of voile recognition. Meanwhile, for the GUI operation for such identification, the following operation can be contemplated: among subtitle lines shown in FIG. 4, a "re-recognition" button is provided for each of the subtitle lines that have been erroneously recognized, and the button is pressed to initiate the follow-up voice recognition.

In the foregoing description, although editing of the subtitles is conducted only by GUI operation, such editing can be further automated. For example, subtitle candidates can also be matched with common keywords or page-by-page presentation text within a specific range. Alternatively, sound elements (sound fragments corresponding to character strings) may be compared with common keywords or page-by-page presentation text.

In addition, the display order in which common keywords are listed in the common keyword list is determined merely based on the assigned weights. However, common keywords can be automatically sorted according to the frequency of usage. For example, the following case can be envisioned: when the number of times the word "IBM" has been subjected to revision exceeds a certain number, the keyword is given a high ranking in the common keyword list.

Furthermore, in the previous description, the correspondence between the subtitle and time is stored in the subtitle DB 36 where subtitles are associated with time and in the page-time DB 37 where pages are associated with time. However, the embodiment is not necessarily limited to such configuration. That is, a DB may be created in which subtitles are directly associated with pages. In addition, such a configuration may be adopted where information other than time information is involved in the association between subtitle and page.

Figure 14:
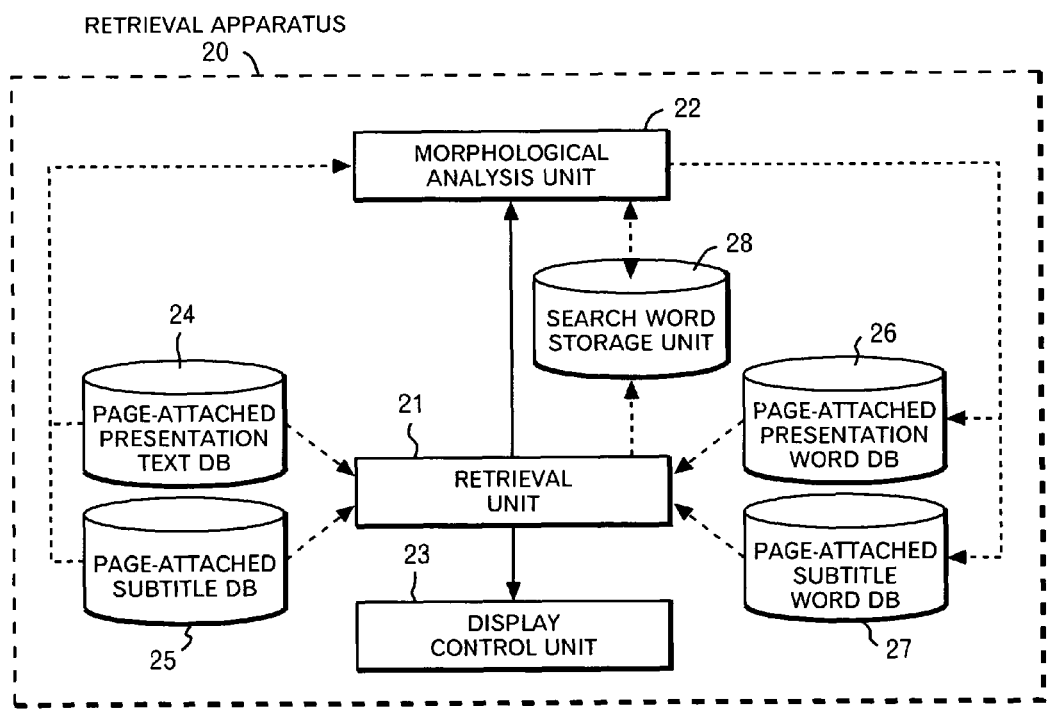
FIG. 14 is a block diagram showing a function configuration of the retrieval apparatus in the embodiment of the present invention.

Next, the retrieval apparatus 20 of the present embodiment will be described in detail. FIG. 14 is a diagram showing a function configuration of the retrieval apparatus 20 of the present embodiment. The retrieval apparatus 20 includes a retrieval unit 21, a morphological analysis unit 22, a display control unit 23, a page-attached presentation text DB 24, a page-attached subtitle DB 25, a page-attached presentation word DB 26, a page-attached subtitle word DB 27 and a search word storage unit 28.

The retrieval unit 21 has a function of searching the page-attached presentation text DB 24 and the page-attached subtitle DB 25 for an inputted target sentence, and searching the page-attached presentation word DB 26 and the page-attached subtitle word DB 27 for words to be searched (search words) that have been obtained as a result of morphological analysis.

The morphological analysis unit 22 has a function of morphologically analyzing a target sentence to decompose it into search words. The display control unit 18 has a function of displaying the result of retrieval.

The page-attached presentation text DB 24 stores presentation text on a page-by-page basis, which is the DB equivalent to the text attribute DB 31 included in the subtitle generation apparatus 10. Specifically, the text attribute DB 31 may be transferred to the retrieval apparatus 20 from the subtitle generation apparatus 10 as it is. Or only the correspondence between page and presentation text except for attributes may be transferred to the retrieval apparatus 20.

The page-attached subtitle DB 25 stores subtitles on a page-by-page basis, which DB is equivalent to a DB obtained by converting the subtitle DB 36 and the page-time DB 37 of the subtitle generation apparatus 10 to a DB storing the correspondence between page and subtitle.

The page-attached presentation word DB 26 stores words on a page-by-page basis, which DB is the DB obtained by morphologically analyzing each presentation text stored in the page-attached presentation text DB 24.

The page-attached subtitle word DB 27 stores subtitle words on a page-by-page basis, which DB is the DB obtained by morphologically analyzing each subtitle stored in the page-attached subtitle DB 25.

Moreover, the search word storage unit 28 is a memory for storing an inputted target sentence, and when the target sentence is morphologically analyzed, the resultant search words are stored therein.

Note that, these functions can be realized when software and hardware resources cooperate. To be more specific, these functions are realized when the CPU 90a of the retrieval apparatus 20 loads programs, which realize functions of the retrieval unit 21, the morphological analysis unit 22 and the display control unit 23 from the magnetic disk device 90e, for example, to the main memory 90c.

Figures 15, 17:
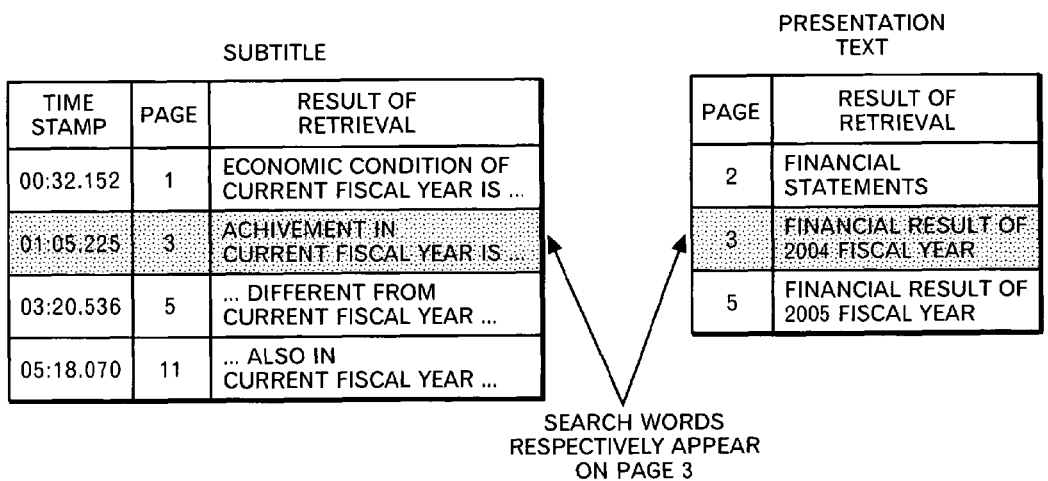
FIG. 15 shows a display example provided by the retrieval apparatus in the embodiment of the present invention.
FIG. 17 is a diagram for explaining the effects of the embodiment of the present invention.

As shown in FIG. 15, the following case will be taken as an example: the sentence "financial results of the current fiscal year" is intended to be retrieved. In this case, no character strings corresponding to the sentence "financial results of the current fiscal year" exist in subtitles and presentation text. Accordingly, the target sentence is morphologically analyzed and thereby it is decomposed into search words ("current fiscal year" and "financial results"), and the search words are retrieved from the subtitles and presentation text. Then, the results of retrieval conducted on both the subtitles and presentation text are mapped on a page-by page basis. That is, the results of retrieval conducted on both the subtitles and presentation text are combined with each other by page, thereby providing optimal results of retrieval.

Figure 16:
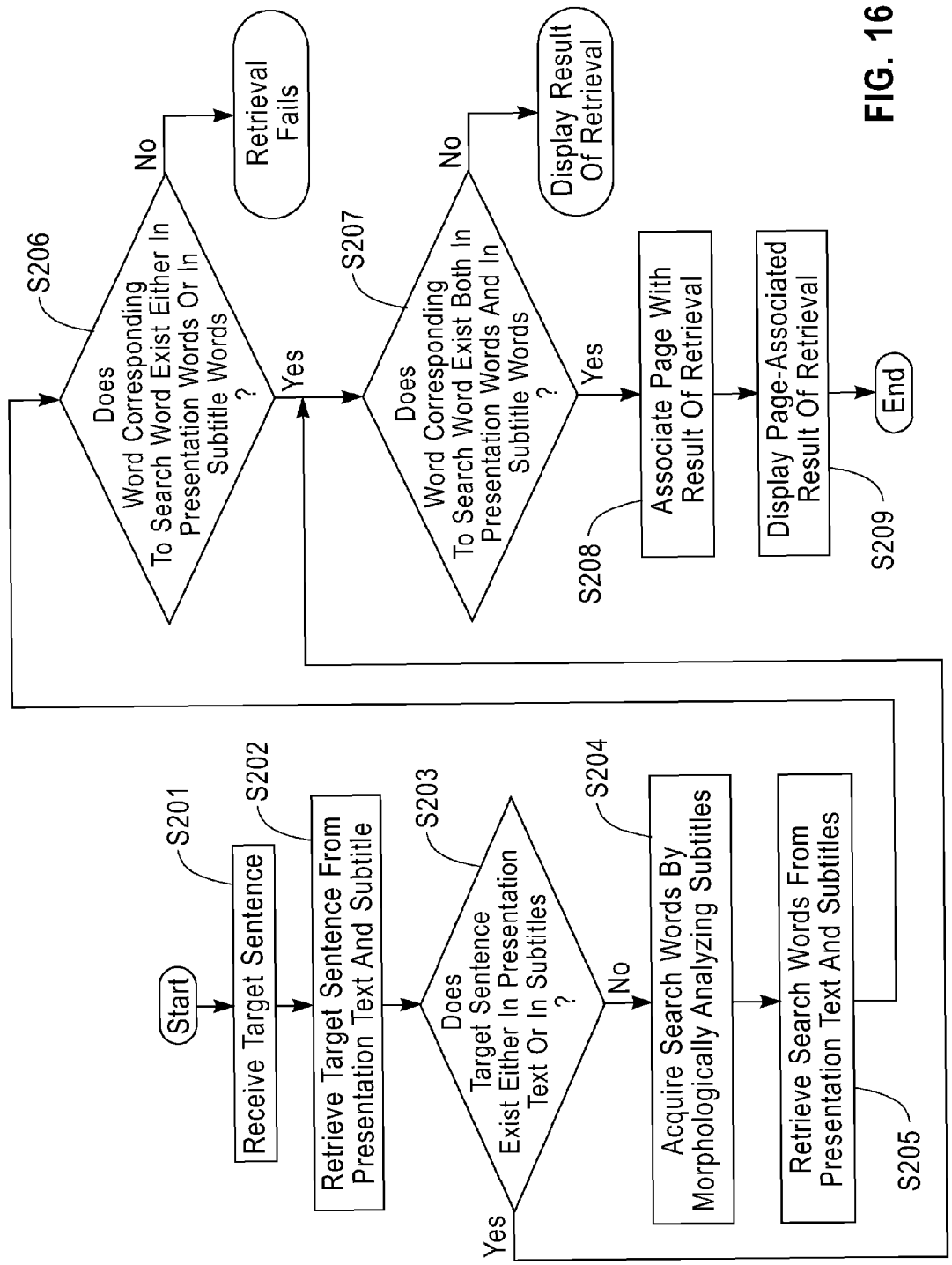
FIG. 16 is a flowchart showing an operation of the retrieval apparatus in the embodiment of the present invention.

FIG. 16 is a flowchart showing an operation of the retrieval apparatus 20 performing such a processing.

At first, the retrieval unit 21 receives a target sentence (Step 201). The target sentence is then retrieved from the presentation text stored in the page-attached presentation text DB 24 and from the subtitles stored in the page-attached subtitle DB 25 (Step 202).

A determination is then made as to whether or not a sentence corresponding to the target sentence exists either in the presentation text or in the subtitles (Step 203). When it is determined that a sentence corresponding to the target sentence exists neither in the page-attached presentation DB 24 nor in the page-attached subtitle DB 25, the target sentence, presentation text and subtitles are respectively subjected to morphological analysis for the acquisition of words (Step 204). To be more specific, words that have been acquired from the target sentence are stored in the search word storage unit 28. In addition, words that have been acquired from the presentation text (hereinafter referred to as "presentation words") are stored in the page-attached presentation word DB 26. Words that have been acquired from the subtitle text (hereinafter referred to as "subtitle words") are stored in the page-attached subtitle word DB 27 and accessed for retrieval.

The retrieval unit 21 then retrieves words stored in the search word storage unit 28 from the presentation words and subtitle words (Step 205).

The retrieval unit 21 then determines whether or not a word corresponding to the search word exists either in the presentation words or in the subtitle words (Step 206). When it is determined that a word that corresponds to the search word exists neither in the presentation words nor in the subtitle words, the retrieval operation fails and accordingly this fact is displayed on the screen.

When it is determined that a sentence that corresponds to the target sentence exists either in the presentation text or in the subtitles in the Step 203, a determination is then made as to whether or not the sentence that corresponds to the target sentence exists both in the presentation text and in the subtitles. Alternatively, when it is determined that a word corresponds to the search word exists either in the presentation words or in the subtitle words in the Step 206, a determination is then made as to whether or not the word that corresponds to the search word exists both in the presentation words and in the subtitle words (Step 207).

When it is determined that a word that corresponds to the search word does not exist both in the presentation text and in the subtitles, the results of retrieval are displayed in the conventional manner.

When it is determined that a word that corresponds to the search word exists both in the presentation text and in the subtitles, the result of retrieval conducted on the presentation text (presentation word) is associated with those conducted on the subtitles (subtitle word) by page (Step 208). The associated result of retrieval is then displayed (Step 209). It should be noted that various publicly known technologies for presenting a retrieval result are present, and therefore the detailed descriptions thereof are omitted here.

In the retrieval example as shown in FIG. 15, unsuccessful retrievals have conventionally made because the sentence "financial results of the current fiscal year" exist neither in the subtitles nor in the presentation text. However, relaxation of conditions highly increases the number of hits, making it difficult for users to obtain a desired result of retrieval. Such situations have occurred because the subtitles and presentations, which are different media, cannot be coupled together by concept of page. However, the retrieval apparatus of the present embodiment never makes such situations happen.

Next, effects of the present embodiment will be described. The applicant of the present invention conducted an experiment in an actual presentation to demonstrate the effects of the present embodiment. The results are shown in FIG. 17. Note that, "Via Voice V10" was used as the voice recognition engine (Via Voice is the registered trademark of IBM Corporation).

As shown in FIG. 17, the addition of common keywords to the voice recognition dictionary beforehand increased the accuracy of voice recognition about by 3%. Additionally, with regard to the increase in the efficiency of subtitle editing, although manual revisions (i.e., input of revised character strings by hand) are needed for about 21% in the traditional technologies, the technology of the present invention succeeded in revising about 6% of erroneously recognized portions by means of revision by GUI (i.e., GUI revisions) instead of using manual revisions. Furthermore, in the second presentation, master subtitles obtained in the first presentation are used, and thereby GUI revisions are increased significantly while reducing manual revisions quite a lot.

As described in the background art, the time required for manual editing depends largely on the level of skill of individual editors, and an enormous burden is put on them. Meanwhile, GUI revisions can reduce both of costs and burden on them. The experiment has demonstrated that editing cost and loads on users are significantly reduced.

In addition, the following additional effects are brought about.

Firstly, according to the present invention, the subtitles, the presentation text, the master subtitles and the like cooperate together, contributing to an increase in the efficiency of the subtitle editing.

In addition, the present embodiment also has an effect that speaker notes are automatically inserted into corresponding pages of the presentation document.

Furthermore, audio indexing and presentation indexing can be readily realized by associating them together on a page-by-page basis.

According to the present invention, it is possible to establish effective cooperation between voice recognition in a presentation and information about presentation documents.

Although the preferred embodiment of the present invention has been described in detail, it should be understood that various changes, substitutions and alternations can be made therein without departing from spirit and scope of the inventions as defined by the appended claims.

The present invention can be realized in hardware, software, or a combination of hardware and software. It may be implemented as a method having steps to implement one or more functions of the invention, and/or it may be implemented as an apparatus having components and/or means to implement one or more steps of a method of the invention described above and/or known to those skilled in the art. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods. Methods of this invention may be implemented by an apparatus which provides the functions carrying out the steps of the methods. Apparatus and/or Systems of this invention may be implemented by a method that includes steps to produce the functions of the apparatus and/or systems.

Computer program means or computer program in the present context include any expression, in any language, code or notation, of a set of instructions intended to cause a system having an information processing capability to perform a particular function either directly or after conversion to another language, code or notation, and/or after reproduction in a different material form.

Thus the invention includes an article of manufacture which comprises a computer usable medium having computer readable program code means embodied therein for causing one or more functions described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. An apparatus for retrieving a character string, said apparatus comprising:
a central processing unit configured for:
recognizing speech in a presentation to produce subtitles;
initializing a keyword database:
extracting keywords from document data used in the presentation;
adding the extracted keywords to a voice recognition dictionary; and
assigning word attribute weights to the keywords extracted from the presentation in accordance with the word attributes of said keywords, wherein said word attributes describe how the keywords appear in the document data;
recording a time that the page is turned and a time when a next page is turned to determine time spent on the page;
calculating a weight of the keywords on a page based on a combination of:
a duration during which said page is displayed in the presentation when it is determined that the extraction of the keyword has been successful; and
the word attribute weights assigned to the keywords, the word attributes comprising at least one of: a title, character size, character underlining, and boldface character;
storage for storing:
  the subtitles;
  the keywords;
  associated information of the subtitles and the keywords;
  the word attributes read from a word attribute database; and
  the time spent on the page when it is determined that the extraction of the keywords has been successful, wherein the time spent on the page is stored as a timestamp;
the word attribute database storing the word attributes; and
the central processing unit used as a retrieval device for retrieving, by use of the associated information, the character string from text data composed of the subtitles and the keywords.

2. The apparatus according to claim 1, further comprising a display for displaying the result of retrieval conducted by the retrieval device, together with the associated information about the result of retrieval.

3. The apparatus of claim 1 wherein the central processing unit is further configured for setting a dictionary which belongs to a category suitable for the keyword as the dictionary to be consulted at a time of recognizing the speech.

4. The apparatus of claim 1 wherein the central processing unit is further configured for displaying the keyword that has been extracted together with the subtitle.

5. The apparatus of claim 4 wherein the subtitle is displayed together with information about a specific page where the subtitle appears.

6. The apparatus of claim 5 wherein the information is text data contained in the specific page.

7. The apparatus of claim 5 wherein the information concerns speech generated with reference to a specific page in the past.

8. The apparatus of claim 7 wherein the central processing unit is further configured for embedding the specific subtitle in the specific page of the document.

9. The apparatus of claim 7 wherein the central processing unit is further configured for retrieving character strings, with a retrieval target range extended from the specific subtitle to text data contained in the specific page.

10. The apparatus of claim 1, wherein calculating the weight of the keywords on the page is further based on a number of times the keyword appeared in the speech of the presentation.

11. The apparatus of claim 1 wherein the central processing unit is further configured for registering the subtitle that has been created so that the subtitle can be consulted at the presentation.

12. A non-transitory storage device comprising a program product which allows a computer to realize:
  using a processor device configured to perform:
    recognizing speech in a presentation to produce subtitles;
    extracting keywords from document data used in the presentation;
    adding the extracted keywords to a voice recognition dictionary; and
    assigning word attribute weights to the keywords extracted from the presentation based on word attributes read from a word attribute database, wherein said word attributes comprise at least one of: a title, character size, character underlining, and boldface character;
  recording a time that the page is turned and a time when a next page is turned to determine time spent on the page;
  storing the time spent as a timestamp;
  calculating a weight of the keywords on a page based on a combination of:
    a duration during which said page is displayed in the presentation when it is determined that the extraction of the keyword has been successful; and
    the word attribute weights assigned to the keywords;
  a function of determining, among the subtitles obtained by recognizing speech generated with reference to a predetermined document, a specific subtitle obtained by recognizing the speech generated with reference to a specific page of the document; and
  a function of storing a correspondence between the specific subtitle and the specific page.

13. The program product according to claim 12, further allowing the computer to realize a function of displaying the specific subtitle together with specific information about the specific page.

14. The program product according to claim 12, further allowing the computer to realize a function of retrieving character strings, with the retrieval target range extended from the specific subtitle to text data contained in the specific page.

* * * * *